US010125905B2

(12) United States Patent
Stahn

(10) Patent No.: US 10,125,905 B2
(45) Date of Patent: Nov. 13, 2018

(54) SCREW ELEMENT FOR THE CONNECTION OF TUBES AND TUBE CONNECTION DEVICE HAVING THIS SCREW ELEMENT

(71) Applicant: TI AUTOMOTIVE (HEIDELBERG) GmbH, Heidelberg (DE)

(72) Inventor: Andreas Stahn, Rauenberg (DE)

(73) Assignee: TI AUTOMOTIVE (HEIDELBERG) GMBH, Heidelberg (DE)

( * ) Notice: Subject to any disclaimer, the term of this patent is extended or adjusted under 35 U.S.C. 154(b) by 502 days.

(21) Appl. No.: 14/729,206

(22) Filed: Jun. 3, 2015

(65) Prior Publication Data

US 2015/0354735 A1  Dec. 10, 2015

(30) Foreign Application Priority Data

Jun. 6, 2014 (DE) .................... 20 2014 102 663 U

(51) Int. Cl.
*F16L 19/00* (2006.01)
*F16L 19/028* (2006.01)
*F16L 19/02* (2006.01)

(52) U.S. Cl.
CPC ............ *F16L 19/00* (2013.01); *F16L 19/028* (2013.01); *F16L 19/0243* (2013.01)

(58) Field of Classification Search
CPC ...................................................... F03D 80/30

USPC ............................................................ 428/99
See application file for complete search history.

(56) References Cited

U.S. PATENT DOCUMENTS 8,172,278 B2    5/2012  Abbott et al.
2008/0129044 A1* 6/2008  Carcagno ............. C09D 163/00
                                                                285/94

FOREIGN PATENT DOCUMENTS

DE         34 32 001 C1   10/1985
DE     10 2010 027 988 A1  10/2010
EP          2 136 119 A1   12/2009
EP          2 657 547 A1   10/2013

OTHER PUBLICATIONS

Search Report of German Utility Model 20 2014 102 663.0 (dated Mar. 26, 2015).

* cited by examiner

*Primary Examiner* — Brent T O'Hern
(74) *Attorney, Agent, or Firm* — Brinks Gilson & Lione

(57) ABSTRACT

The invention relates to a screw element for the connection of tubes, preferably motor vehicle lines. A threading and at least one contact surface without threading are provided on the screw element. The screw element has an outer coating and an inner coating. The outer coating comprises a first polymer and nanoparticles of a first solid material. The inner coating may also comprise nonoparticles or a polymer.

8 Claims, 2 Drawing Sheets

SCREW ELEMENT FOR THE CONNECTION OF TUBES AND TUBE CONNECTION DEVICE HAVING THIS SCREW ELEMENT

CROSS-REFERENCE TO RELATED APPLICATIONS

This application claims priority pursuant to Title 35 USC § 119 to German Application for Patent Serial No. DE 20 2014 102 663.0, filed Jun. 6, 2014 entitled, Screw Element for the Connection of Tubes and Tube connection Device Having This Screw Element.

BACKGROUND OF THE INVENTION

The present invention relates to a screw element, in particular for the connection of tubes. The tubes are preferably motor vehicle lines, and are particularly preferably brake lines. A threading and at least one contact surface without threading are provided on the screw element. The screw element has an outer coating and an inner coating. The invention furthermore relates to a tube connection device for the connection of tubes, in particular motor vehicle tubes having such a screw element.

Screw elements, or tube connection devices of the type described above are fundamentally known in the field. In particular screw elements designed as threaded bolts are known, with which tubes from brake lines are connected to assemblies of the brake lines, such as the main brake cylinder, brake pressure distributors or brake power boosters.

These known screw elements are provided with a complete inner coating having a first high friction coefficient. The known screw elements are also provided with an outer coating, which is applied only in the region of the contact surfaces and has a lower friction coefficient than the inner coating. Due to the sliding friction being reduced in this manner during the tightening of the screw element, these screw elements can be tightened to a greater extent, making it more difficult to loosen the screw connection.

These known coatings are applied by means of electroplating, metallization or other methods, which are associated with large time expenditures and high costs.

SUMMARY OF THE INVENTION

In order to solve this technical problem, the invention teaches of a screw element for the connection of tubes, preferably motor vehicle lines, wherein a threading and at least one contact surface without a threading are provided on the screw element, wherein the screw element has an outer coating and an inner coating, wherein the outer coating comprises a first polymer and nanoparticles of a first solid material.

The term "screw element" refers to any element that can be screwed, having a threading. This term further comprises an appropriate metal substrate, on which zinc or zinc/nickel coatings are applied, including the passivation, for example.

The term "motor vehicle lines" comprises, among others, tubes for fuel, urea solutions, coolants, and in particular brake fluids. The motor vehicle line according to the invention is preferably a brake fluid line.

Contact surfaces of the screw element are those surfaces without threading that exert a force on the corresponding counter-screw element when screwed together. This can be the underside of a screw head, or a bottom surface of a threaded shaft.

The distinction between an "outer coating" and an "inner coating" is twofold. Firstly, it concerns different materials, and secondly, the inner coating lies between the outer coating and the metal substrate of the screw element. The expression "inner" should not be equated thereby with "innermost." The same applies analogously for the expression "outer."

Polycondensates, in particular, can be used as the polymers. The polymer is preferably a polyamide or a polyimide.

The term "nanoparticle" refers to particles having arithmetically determined particle sizes between 1 nm and 10,000 nm, preferably between 10 nm and 1,000 nm, and particularly preferably between 20 nm and 400 nm. According to a particularly preferred embodiment, the arithmetically determined particle size of the nanoparticles is 50 nm to 200 nm.

The first solid material is preferably a substance having a high degree of hardness or a lubricating solid. In particular, the solid material has a Mohs hardness of >7, and preferably >8. The first solid material is preferably a metal oxide, and is selected, in particular, from the group of substances comprising "aluminum oxide (corundum), iron oxide, silicon carbide, silicon dioxide, silicon nitride, titanium carbide, titanium nitride."

Boron nitride, graphite, molybdenum disulfide, polytetrafluoroethylene and carbon fibers, in particular, are suitable lubricating solids.

It is within the scope of the invention that the outer coating covers the screw element to a large extent, and preferably entirely. The expression "to a large extent" means that at least 50% of the surface of the screw element is covered by the outer coating. In particular, the outer coating covers the inner coating. The outer coating preferably covers the inner coating and also the remaining surface of the screw element.

The friction coefficient $\mu_1$ of the outer coating is advantageously greater than the friction coefficient $\mu_2$ of the inner coating. The friction coefficient $\mu_1$ of the outer coating preferably lies between 0.15 and 0.5, and particularly preferably between 0.2 and 0.4. The friction coefficient $\mu_2$ of the inner coating preferably lies between 0.01 and 0.3, particularly preferably between 0.02 and 0.15, and very particularly preferably between 0.03 and 0.1. The friction coefficients always relate to the sliding friction on aluminum, determined in a dry state.

The inner coating is advantageously disposed in the region of the at least one contact surface, and preferably disposed only on the at least one contact surface. It is particularly preferred that the inner coating is disposed on only two contact surfaces. In particular, the inner coating is disposed on the underside of the screw head. The inner coating is preferably applied to a bottom surface of a threaded shaft.

According to an advantageous embodiment, the coating thickness of the outer coating is 0.5 µm to 10 µm. Preferably the coating thickness of the outer coating is 1 µm to 5 µm, and particularly preferably 2 µm to 4 µm. It is within the scope of the invention that the coating thickness of the inner coating is 10 µm to 100 µm. The coating thickness is preferably 20 µm to 40 µm, and is particularly preferably 25 µm to 35 µm.

It is within the scope of the invention that the portion of nanoparticles in the outer coating is 2% to 40% and preferably 5% to 20% of the weight of the outer coating. The weight relates thereby to the applied and hardened coating.

The portion of the nanoparticles in the outer coating is particularly preferably 8% to 15% of the weight of the outer coating.

It is within the scope of the invention that the inner coating comprises a polymer. The polymer is preferably a polycondensate, and is particularly preferably a polyamide or a polyimide. The inner coating preferably comprises nanoparticles of a second solid material. The second solid material is preferably a lubricating solid. The second solid material is particularly preferably PTFE or molybdenum disulfide. It is within the scope of the invention that the portion of nanoparticles in the inner coating is 2% to 40% and preferably 5% to 20% of the weight. The portion of nanoparticles in the inner coating is particularly preferably 8% to 15%.

It is within the scope of the invention that the screw element is a union screw. The expression "union screw" means, in particular, that the screw element has a through bore. Preferably the threading of the screw element is formed as an external thread. According to one advantageous embodiment, the screw element has a screw head, through which the through bore likewise extends. The screw head comprises an underside contact surface.

The invention furthermore relates to a tube connection device for the connection of tubes, in particular motor vehicle lines, having a screw element according to the invention and having a connecting element, wherein the screw element can be screwed together with the connecting element.

It is within the scope of the invention that in an assembled state, the contact surfaces of the screw element rest against contact surfaces of the connecting element, or against contact surfaces of a flange on the tube, respectively. Preferably the flange on the tube is designed as an F-flange. According to an advantageous embodiment, the flange has a sealing surface, which is allocated to a connecting surface of the connecting element, and, accordingly, has a complementary shape. According to another embodiment, the flange on the tube is designed as an E-flange.

The invention furthermore relates to a method for manufacturing screw elements, in particular screw elements according to the invention, wherein the screw element has a threading and at least one contact surface without threading, wherein the screw element is coated with an inner coating, wherein the screw element is then provided with an outer coating, wherein the outer coating comprises a first polymer and nanoparticles of a first solid material. Preferably the outer coating is applied to the screw element by means of spray drums. The inner coating is advantageously applied to the screw element by means of spray drums.

The invention makes use of the finding that, due to the teachings according to the invention, an unintentional loosening of the screw element can be prevented in a simple manner. Surprisingly, it has been found that, as a result of the application of different coatings, according to the invention, this also applies when the inner coating has a lower friction coefficient than the outer coating. The effect is based on the fact that the adhesion between the inner and outer coatings is low, such that when the screw element is tightened, the two coatings slide over one another. This sliding compensates for the torsional forces when tightening the screw element. The screw can be tightened accordingly. At the same time, regions having greater friction coefficients, such as on the threads, prevent a loosening of the screw element.

The invention furthermore makes use of the fact that the nanoparticles prevent the development of cracks in the coatings. If a coating according to the invention is damaged, it is more stable, due to the prevention of the development of cracks, and as a result, better protects the screw element from corrosion. In particular, a corrosion of the outer coating is prevented in this manner. Furthermore, particle sizes in the nanometer range make it possible to form the coatings such that they are correspondingly thin. In this manner, it is easier to obtain a dimensional accuracy for the screw elements according to the invention. The combination of a polymer and nanoparticles allows for a good miscibility of both materials, while at the same time it is still easy, and thus cost-effective, to apply the coating by means of spray drums, for example. Due to the good miscibility it is also possible to coordinate the respective solid materials, and thus to adjust the friction coefficients, for example, according to the requirements.

DESCRIPTION OF THE DRAWINGS

The invention shall be explained in greater detail below based on drawings depicting only one exemplary embodiment. Schematically shown therein are.

DETAILED DESCRIPTION

Figure 1:
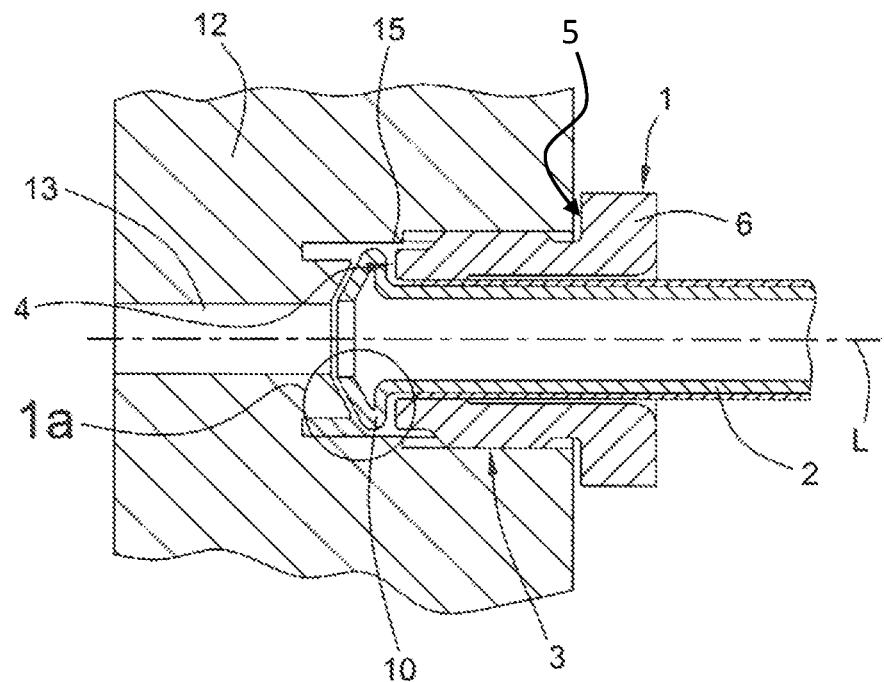
FIG. 1 is a longitudinal section of a screw element according to the invention, designed as a threaded bolt, in an assembled state.
Figure 1A:
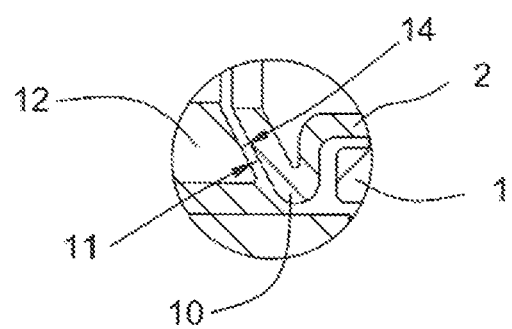
FIG. 1a is a sectional view on an enlarged scale of a portion of the apparatus of FIG. 1.

In FIG. 1 a screw element designed as a threaded bolt 1 is screwed into a connecting element in the form of a connecting block 12. The threaded bolt 1 has a thread 3 in the form of an external thread for this, and the connecting block 12 has a blind hole 15 having an internal thread. Prior to the screwing, a tube 2 having a longitudinal axis L is inserted in the threaded bolt 1, such that by screwing in the threaded bolt 1, a flange 10 is clamped between the threaded bolt 1 and the connecting block 12.

When the threaded bolt 1 is tightened via a bolt head 6 on the threaded bolt 1, the threaded bolt 1 presses against the flange 10 with a contact surface 4. At the same time, a sealing surface 11 of the flange 10 presses against a connecting surface 14 of the connecting block 12. A liquid-tight connection between the tube 2 and a line 13 integrated in the connecting block 12 is generated in this manner, such that brake fluid leakage is prevented.

Figure 2:
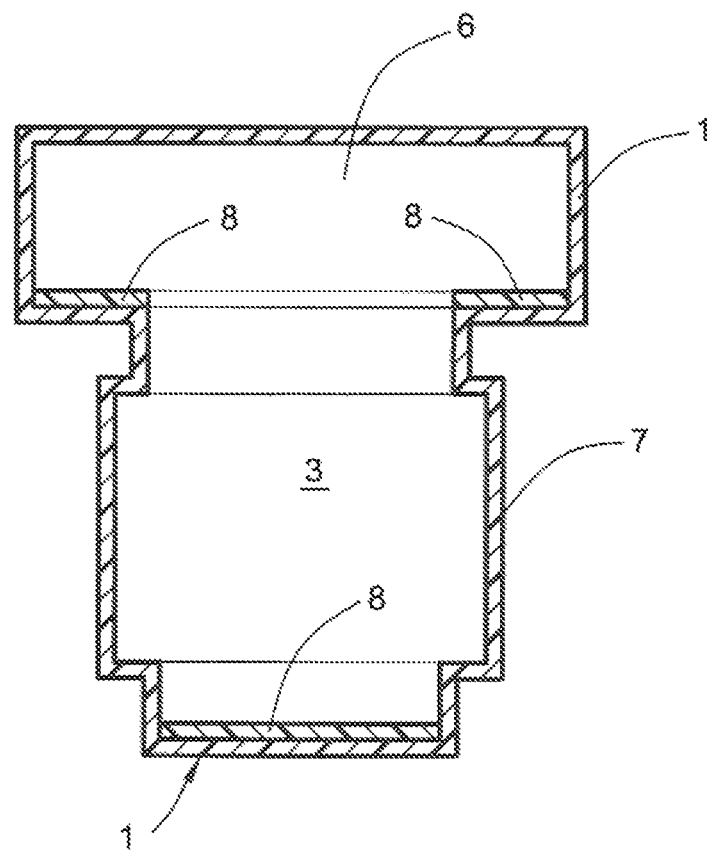
FIG. 2 is a side view of the threaded bolt from FIG. 1 schematically illustrating the layers of coating.

FIG. 2 shows the threaded bolt 1 from FIG. 1 incorporating the principles of the invention in a symbolic side view. The outer perimeter of the threaded bolt 1 symbolizes the coatings 7 and 8. The outer coating 7 covers the surface of the threaded bolt 1 in its entirety. The inner coating 8, on the other hand, is applied only to the contact surfaces 4 and 5 of the threaded bolt 1.

The threaded bolt 1 is manufactured in the known manner. This manufacturing also comprises a corrosion protection coating, comprising zinc and nickel. The corrosion protection coating is then coated with a passivation coating, which protects, in turn, the zinc/nickel coating. The inner coating 8 is first applied thereto, and lastly, the outer coating 7 is applied.

Both the inner coating 8 as well as the outer coating 7 comprise a binder made of a polycondensate. The polycondensate for the inner coating 8 binds molybdenum disulfide nanoparticles having an arithmetically determined particle size of 100 nm. The portion of molybdenum disulfide nanoparticles in the inner coating 8 is 10% by weight. The inner coating is applied with a coating thickness of 30 μm.

The outer coating 7 is provided with tungsten(IV) sulfide nanoparticles. The tungsten(IV) sulfide nanoparticles have a mean particle size of 180 nm, and make up 15% by weight of the outer coating 7. The coating thickness of the outer coating 7 is selected at 4 μm. Both coatings 7, 8 are applied by means of spray drums.

It must be understood that the threaded bolt of FIG. 1 is illustrative of an embodiment of the invention. The parameters of the coatings and their makeup may be varied consistent with the disclosure of the specification.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The claims are to be construed to include alternative embodiments to the extent permitted by the prior art.

I claim:

1. A union screw for the connection of tubes, for motor vehicle lines, wherein a threading and a bottom contact surface without threading are provided on the union screw, wherein the union screw comprises a through bore and a screw head, wherein the through bore extends through the screw head, wherein the screw head comprises an underside contact surface, wherein the union screw has an outer coating and an inner coating, wherein the inner coating lies between the outer coating and a metal substrate of the union screw, wherein the outer coating comprises a first polymer and nanoparticles of a first solid material, wherein the union screw has an outer surface, wherein the outer coating covers at least 50% of the outer surface of the union screw, and wherein the friction coefficient μ1 of the outer coating is greater than the friction coefficient μ2 of the inner coating.

2. The union screw according to claim 1, wherein the inner coating is disposed in a region of the bottom contact surface.

3. The union screw according to claim 1, wherein the coating thickness of the outer coating is 0.5 to 10 μm.

4. The union screw according to claim 1, wherein the coating thickness of the inner coating is 10 to 100 μm.

5. The union screw according to claim 1, wherein the portion of the nanoparticles in the outer coating is 2% to 40% of the weight.

6. The union screw according to claim 1, wherein the inner coating comprises a polymer.

7. The union screw according to claim 1, wherein the inner coating comprises nanoparticles of a second solid material.

8. The union screw according to claim 7, wherein the portion of nanoparticles in the inner coating is 2% to 40% of the weight.

\* \* \* \* \*